United States Patent [19]

Focke

[11] Patent Number: 5,090,553
[45] Date of Patent: Feb. 25, 1992

[54] PROCESS AND COVEYING APPARATUS FOR THE CONVEYANCE OF OBJECTS

[75] Inventor: Heinz Focke, Verden, Fed. Rep. of Germany

[73] Assignee: Focke & Co. (GmbH & Co.), Verden, Fed. Rep. of Germany

[21] Appl. No.: 516,578

[22] Filed: Apr. 30, 1990

[30] Foreign Application Priority Data

May 10, 1989 [DE] Fed. Rep. of Germany ....... 3915246

[51] Int. Cl.$^5$ .......................................... B65G 17/32
[52] U.S. Cl. ................................................ 198/377
[58] Field of Search ................. 198/377, 474.1, 802, 198/951

[56] References Cited

U.S. PATENT DOCUMENTS

| | | | |
|---|---|---|---|
| 2,929,489 | 3/1960 | Parrish | 198/951 X |
| 2,965,215 | 12/1960 | Molins | 198/951 X |
| 2,988,198 | 6/1961 | Pinkham | 198/951 X |
| 3,195,451 | 7/1965 | Hovekamp et al. | 198/377 |
| 3,215,250 | 11/1965 | Schubert | 198/951 X |
| 3,269,516 | 8/1966 | Lucas | 198/377 |
| 3,311,051 | 3/1967 | Rudolph et al. | 198/377 X |
| 3,612,254 | 10/1971 | Wideman | 198/377 X |
| 3,621,974 | 11/1971 | Bavers | 198/377 |
| 3,677,389 | 7/1972 | Benatar et al. | 198/377 |
| 3,858,709 | 1/1975 | Banyas et al. | 198/377 |
| 3,858,716 | 1/1975 | Frische | 198/377 |
| 3,934,714 | 1/1976 | Matsumoto | 198/379 |
| 4,463,846 | 8/1984 | Ionescu | 198/400 |
| 4,483,526 | 11/1984 | Bulka et al. | 198/377 |
| 4,832,173 | 5/1989 | Hattori et al. | 198/377 |

FOREIGN PATENT DOCUMENTS

| | | |
|---|---|---|
| 229787 | 10/1963 | Australia . |
| 0203605 | 12/1986 | European Pat. Off. . |
| 1205014 | 11/1965 | Fed. Rep. of Germany . |
| 1481390 | 2/1969 | Fed. Rep. of Germany . |
| 2538169 | 3/1977 | Fed. Rep. of Germany . |
| 3608870 | 11/1986 | Fed. Rep. of Germany . |
| 3710105 | 10/1988 | Fed. Rep. of Germany . |

OTHER PUBLICATIONS

Patent Abstracts of Japan vol. 9, No. 98 (M-375) (1821) Apr. 27, 1985 & JP-A-59 223623 (Daiichi Kogyo) Dec. 15, 1984.

Primary Examiner—Robert P. Olszewski
Assistant Examiner—Cheryl L. Gastineau
Attorney, Agent, or Firm—Sughrue, Mion, Zinn Macpeak & Seas

[57] ABSTRACT

The invention relates to a process and an apparatus for the conveyance of objects, preferably packages, along a conveying path. The object according to the invention consists in turning objects to be turned during conveyance in a controlled manner about an axis aligned perpendicular to the conveying path. The object is achieved by a process, in which the objects which are to be turned are moved in sequence at a relative speed along a guide organ extending in the conveying direction in such a way that roller elements thereby roll off on the guide organ, the roller movements of which roller elements are converted into the turns of the respective associated objects.

18 Claims, 4 Drawing Sheets

PROCESS AND COVEYING APPARATUS FOR THE CONVEYANCE OF OBJECTS

BACKGROUND OF THE INVENTION

The invention relates to a process for the conveyance of objects, preferably packages, along a conveying path. Furthermore, the invention relates to a conveying apparatus.

When objects are being conveyed along a conveying path, the problem frequently occurs that the objects have to be put into a different position relative to one another or to work devices. In particular, this problem frequently occurs within the framework of packaging technology.

SUMMARY OF THE INVENTION

The underlying object of the invention is therefore, within the framework of a process of the generic type mentioned at the beginning, to turn objects, in particular packages, in a controlled manner during conveyance about an axis aligned transversely, in particular perpendicular to the conveying direction.

According to the invention, the object is achieved by the fact that the objects which are to be turned are moved in sequence at a relative speed along a guide organ extending in the conveying direction in such a way that roller elements thereby roll off on the guide organ, the roller movements of which roller elements are converted into the turns of the respective associated objects.

With the process according to the invention, a controlled turn about the axis is carried out advantageously for each individual one of the objects to be turned. The turn is controlled among other reasons because the angle of turning about which each object is turned can be predetermined precisely by the length of the extending guide organ and/or the conveying speed, the radius of the roller elements also being incorporated.

The process according to the invention has the advantage in particular that the objects can be turned in a defined manner during the continuous conveying process; that is to say it is not necessary, for example, to interrupt the actual conveying process for the time during which the turn is carried out.

Another development of the process according to the invention provides for the guide organ to be moved in its direction of extension. In this case, the guide organ can move in the conveying direction or in the opposite direction. The salient point is that a relative speed remains, which can be defined as precisely as possible, between the conveyed objects and the guide organ. With the process according to the invention, the speed of the guide organ can also be used to predetermine the angle of turning of the objects, for which purpose the speed of the guide organ is preferably controllable.

The guide organ can, for example, be a circulating belt or toothed belt, of which the strand facing the objects to be turned, which strand extends in the longitudinal direction of the conveying path, is the actual guide organ for the roller elements. The guide organ is preferably guided in the direction of movement.

Another development of the process according to the invention provides for carriers having the roller elements for the objects to be guided in the conveying direction outside the region of the guide organ. The carriers can be constructed in virtually any manner to carry the objects, which is also dependent on the construction of the objects themselves. These carriers are guided outside the region of the guide organ in order to guide the roller elements in the correct position to the beginning of the guide organ and in order to move the carriers on again in the conveying direction after passing the guide organ. Consequently, guides can be provided before and/or after the guide organ.

In this case, the guides can be constructed in particular in such a way that turning of the objects is prevented by the guides in the regions before and after the guide organ. Guides could also be provided in the region of the guide organ, which guides must then, however, be constructed in such a way that they allow the roller movement of the roller elements and the turning of the transfer parts and guide the carriers forcibly solely in the conveying direction.

A conveying apparatus having a conveying path, in particular for carrying out the process according to the invention, for which independent protection is also claimed, is distinguished by a guide organ, extending in the conveying direction, and by carriers, moved in the conveying direction, for the objects to be turned, which carriers have roller elements, which can roll off on the guide organ, and transfer members to transfer the roller movement to the objects.

The carriers can, for example, have plates, onto which the objects are placed, but receiving pockets, hook elements or the like can also be provided to hold the objects.

A carrier of simple construction could, for example, be a plate which is mounted rotatably, projects radially over the object which it carries and has a circular circumference in order to be able to function as a roller element itself.

The guide organ and the roller elements can be frictionally engaged elements adapted to one another, for example frictional wheel and frictional surface, but they can also be positive-fit elements adapted to one another, for example a toothed wheel and a rack or a circulating toothed belt.

The guide organ can preferably be driven to effect a movement in its direction of extension. In this case, the movement can be effected in the conveying direction or counter to the conveying direction in order to achieve a relative speed between the conveyed objects and the guide organ. The speed of the guide organ is preferably controllable. The direction of circulation of the guide organ is preferably reversible.

In a preferred construction of the conveying apparatus according to the invention, each carrier for one object is rotatable about its own axis perpendicular to the conveying direction and the associated roller element is seated fixedly in terms of rotation on a corresponding shaft. The carrier constructed in this manner can be produced simply and cost-effectively. It is therefore profitable for conveying devices to have carriers of this type even if turning is not always necessary and not every object which is conveyed has to be turned.

Generally, each object to be turned is provided with its own carrier. To transfer the conveying movement to the object itself, the carrier can, in turn, be mounted on a conveyor belt or the like in such a way that it is carried along in the conveying direction by the conveyor belt, but is able to make a turning movement about its axis at least in the region of the guide organ.

Each carrier preferably has a pocket for the object in order to prevent the object from slipping during the turn. The guide organ is preferably guided in its direction of movement. The guide can serve as an abutment for the roller elements in the case of a flexible guide organ.

At least one guide is also preferably provided for the carriers outside the region of extension of the guide organ. The guide is preferably a rail constructed in such a way that the carriers are guided forcibly and fixedly in terms of rotation with regard to the axes of rotation of the objects. The guide is preferably a U-shaped rail, open at the top, and each carrier has on its underside a guide piece which is guided in the rail and assumes a greater length than width.

The guides described above for the carriers can be used before and after the guide organ, in particular when the objects are to be turned by 180° or a whole multiple of 180°. If, in contrast, the objects are to be turned by intermediate angular positions, there must be a guarantee, in particular in the case of a guide arranged after the guide organ, that the guide piece of the carrier and the guide fit together again after carrying out the turn about a certain turning angle.

This can be guaranteed, for example, by the fact that the guide piece does not complete the turn together with the object or the roller elements, or by the fact that each carrier has on its underside a guide piece which has a plurality of guide channels arranged offset in terms of rotation with regard to the axis of rotation of the object for the introduction of the guide. In this case, the guide itself can be constructed, for example, as a guide web.

Exemplary embodiments, from which further inventive features emerge, are illustrated in the drawing, in which:

DETAILED DESCRIPTION OF PREFERRED EMBODIMENTS

Figure 1:
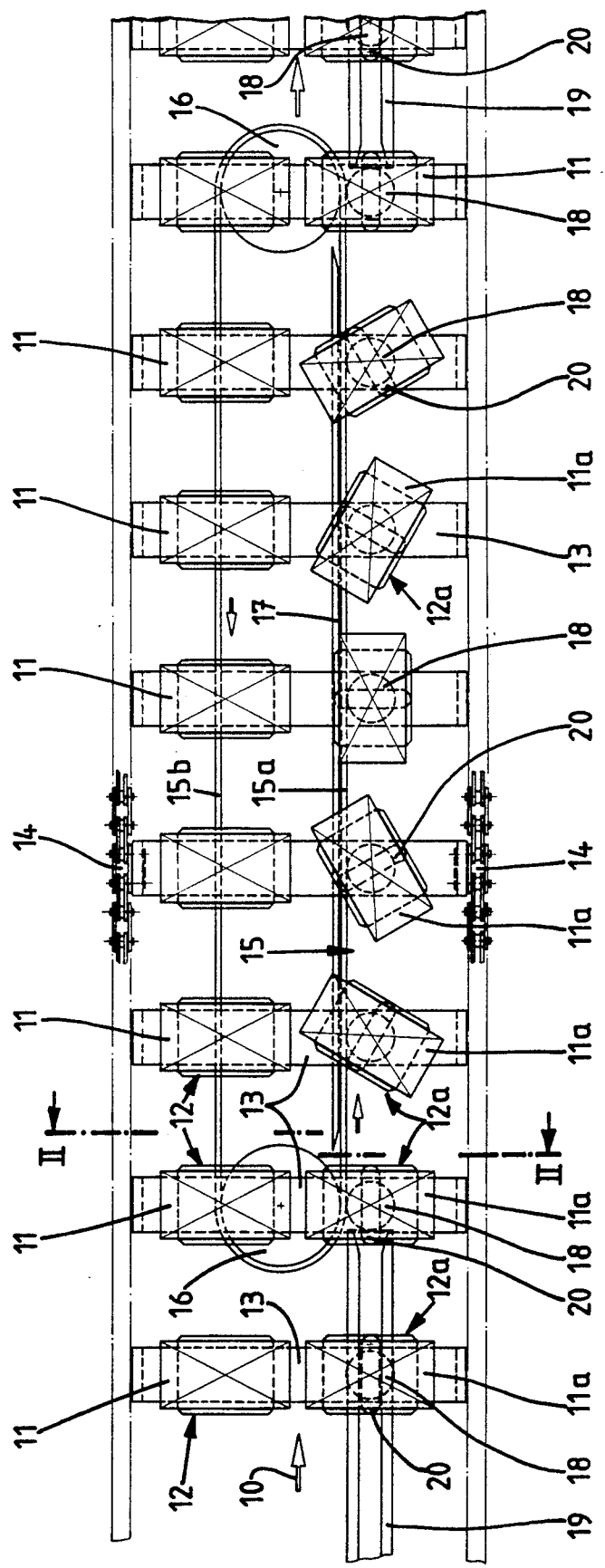
FIG. 1 shows a plan view onto a section of a conveying path of a conveying apparatus according to the invention.

FIG. 1 shows a plan view onto a section of a conveying path of a conveying apparatus. In the conveying direction 10, packages 11, 11a are transported as objects in two adjacent rows along the conveying path. The packages 11, 11a are carried by carriers 12, 12a which, in turn, are arranged on transverse bars 13 which are moved by conveying chains 14 in the conveying direction 10.

Of the packages 11, 11a conveyed in two rows, the packages 11a of one row—the lower row in the drawing—are arranged on rotatable carriers 12a in order to enable controlled turning of the packages 11a together with the carriers 12a during conveyance.

For turning the carriers 12a, a belt 15 with strands 15a, 15b is provided as the guide organ which circulates endlessly around deflection rollers 16. In the exemplary embodiment of FIG. 1, the first strand 15a of the belt 15 moves in the conveying direction 10 and the second strand 15b counter to the conveying direction 10. The carriers 12a to be turned are assigned to the first strand 15a. The first strand 15a is guided on a guide rail 17.

The rotatable carriers 12a each have roller elements 18 constructed like a wheel, which roller elements roll off in the region of the first strand 15a of the belt 15 on this strand 15a due to the relative speed between the conveyed carriers 12a and the strand 15a and, during this process, they turn about their axis perpendicular to the conveying path. The roller elements 18 are seated fixedly in terms of rotation on shafts of the carriers 12a such that the carriers 12a turn with the roller elements.

In the exemplary embodiment of the conveying apparatus shown, the belt 15 and wheel-like roller elements 18 are frictionally engaged elements adapted to one another, namely a frictional strap and frictional wheels. In this case, the frictional resistance can be increased by appropriate choice of material, in particular by coating the frictional wheels with rubber or the like.

The guide organ 15 and the roller elements 18 could also be positive-fit elements adapted to one another. The roller elements 18 could, for example, be toothed wheels and the guide organ 15 could be a circulating toothed belt or a chain.

Outside the region of the belt 15, guides 19 constructed as U-shaped rails are provided which are open at the top and extend below the carriers 12a and in which elongated guide pieces 20, arranged at the bottom ends of the axes of rotation of the carriers 12a, can be guided in a sliding manner.

In the exemplary embodiment illustrated in FIG. 1, the carriers 12a and thus also the packages 11a are turned by 180° along the belt 15 such that, after turning, the guide pieces 20 can be reintroduced into the U-shaped rail 19 which is arranged after the belt 15.

Figure 2:
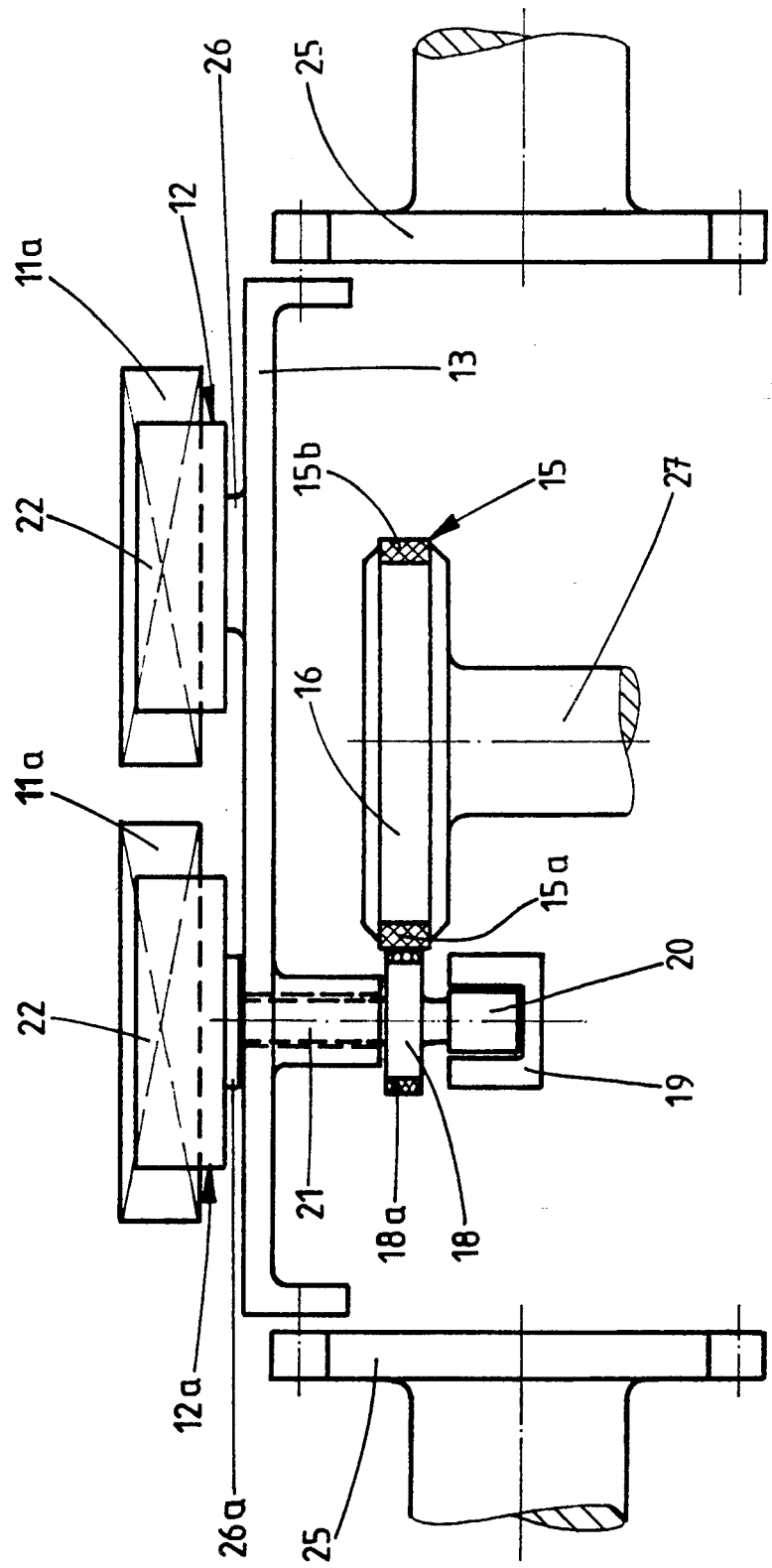
FIG. 2 shows a section through the apparatus according to FIG. 1 along the dot-dashed line denoted in FIG. 1 as II—II.

FIG. 2 shows a section through the conveying apparatus according to FIG. 1 along the dot-dashed line denoted in FIG. 1 as II—II.

In this and in the following figures, the same construction elements are denoted with the same reference numerals as in FIG. 1 respectively.

It can be seen in particular in this FIG. 2 how the guide pieces 20 are guided in the U-shaped rails 19 and how the roller elements 18 roll off on the strand 15a of the belt 15. In the exemplary embodiment illustrated, the roller element 18 and the strand 15a are frictionally engaged elements adapted to one another. It can be seen that the roller elements 18 as frictional wheels are provided with coatings 18a in order to increase the frictional resistance.

It can further be seen in FIG. 2 that the roller element 18 is seated on a shaft 21 of the carrier 12a, which shaft serves as the transfer member to transfer the roller movement of the roller element 18 to the package 11a. The carrier 12a has a receptacle for this package 11a, which receptacle is constructed as a pocket 22 and prevents slipping of the package 11a during the turning movement. The pocket 22 has a cross-section which is U-shaped in profile and the package 11a is placed or wedged between the legs of this U-shaped profile.

The carriers 12 and 12a are arranged and interconnected on the transverse bars 13. The transverse bars 13 are driven by drive wheels 25 via the conveying chains 14.

Both types of carriers 12 and 12a have plate elements 26, 26a, on which the receptacles 22 are arranged. The plate elements 26 of the non-rotatable carriers 12 are arranged fixedly on the transverse bars 13. The plate elements 26a of the rotatable carriers 12a rest rotatably on the transverse bars 13. The shafts 21 which are passed through the transverse bars 13 are attached to the plate elements 26a. Seated fixedly in terms of rotation on the shafts 21 are the roller elements 18, and seated at the end of the shafts 21 are the guide pieces 20. The shafts 21 extend coaxially to the perpendicular mid-axes of the carriers 12a and parallel to the shafts 27 of the deflection rollers 16. In this case, the plane of the shafts 21 and the plane of the shaft 27 are spaced apart from one another in such a way that the roller elements 18 and the strand 15a of the belt 15 are in frictional contact. Any deviation of the shafts 21 from their plane is prevented by their mounting in the transverse bars 13 and, before reaching the belt 15, by the guide 19.

Figure 3:
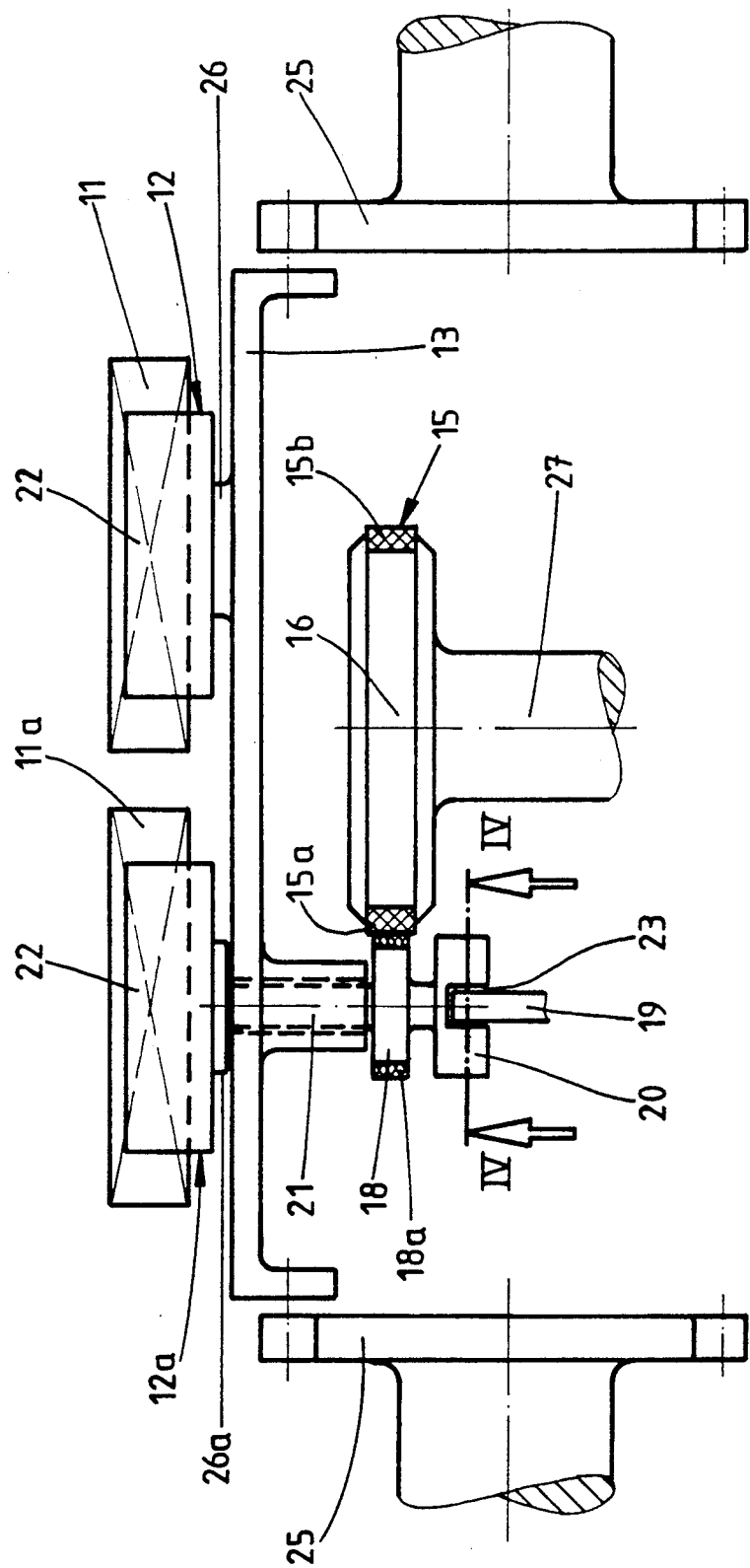
FIG. 3 shows a second exemplary embodiment of a conveying apparatus with modified carrier guiding in a section according to FIG. 2

FIG. 3 shows a second exemplary embodiment of a conveying apparatus corresponding to the illustration of FIG. 2.

The exemplary embodiment illustrated in FIG. 3 is distinguished from the exemplary embodiment illustrated in FIG. 2 solely by the modified construction of guide piece 20 and guide rail 19. In the exemplary embodiment according to FIG. 3, the guide piece 20 now has, in kinematic reversal, a guide channel 23 into which the guide rail 19, constructed as a web, can be introduced.

Figure 4:
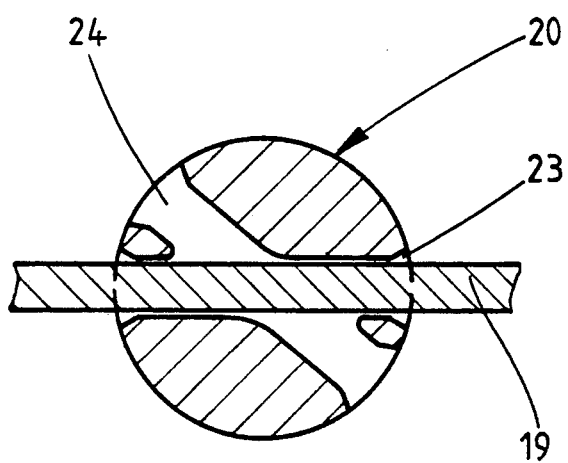
FIG. 4 shows a section through a carrier of the conveying apparatus according to FIG. 3 along the dot-dashed line denoted in FIG. 3 as IV—IV.

FIG. 4 shows a section through the guide rail 19 and the guide piece 20 along the dot-dashed line denoted in FIG. 3 as IV—IV.

It can be seen in this FIG. 4 that the guide piece 20 has a plurality of guide channels 23, 24 for different turning positions of the carrier 12a to receive the guide rail 19. The guide channels 23, 24 are arranged around the shaft 21 offset in terms of rotation, and to be precise by the angle which corresponds to the turning angle about which the carrier 12a and the package 11a are to be turned from the beginning to the end of the belt 15. It is guaranteed by this means that the guide piece 20 fits onto the respective guide rails 19 before and after the turn before and after the belt 15. At their ends, the guide channels 23, 24 are each bevelled at their vertical edges to facilitate the gliding in of the guide web 19.

The turning angle α about which the package 11a is to be turned during conveyance can be expressed and, finally, also predetermined by the geometry of the conveying apparatus, the following simple equation resulting for the turning angle α:

$$\alpha = \frac{X \cdot 360}{D \cdot \pi}$$

in which X is the path differential between the spacing of the shafts 27 of the deflection rollers 16 and the path travelled by one point on the guide organ 15 during the time in which a roller element 18 rests on the belt. Contained implicity in this path differential is the speed differential between the belt 15 and the conveying speed of the carriers 12a.

D is the diameter of the roller element 18.

Using this equation, the desired turning angle can be predetermined via the regulation of the speeds.

What is claimed is:

1. A process for conveying first and second packages side-by-side in first and second adjacent parallel rows, respectively, in a conveying direction along a conveying path, comprising the steps of:

placing the packages of both rows in a first angular orientation;

while simultaneously conveying the packages in both rows, turning the first packages in the first row to place them in a second angular orientation rotated by 180° relative to said first angular orientation, and retaining the second packages in the second row in said first angular orientation; wherein said turning step comprises turning each of the first packages around an axis perpendicular to a plane containing said conveying path and said first and second parallel rows;

providing an endless moving member having a movement in said conveying direction and extending in said conveying direction adjacent said first row; and rotatably supporting the first packages in said first row on respective first carriers which engage said moving member to turn each first package from said first angular orientation to said second angular orientation.

2. The process as defined in claim 1, further comprising the step of converting the movement of said moving member to a rotation of each of said first carriers by placing said moving member into frictional engagement with said first carriers.

3. A process as defined in claim 2, further comprising the step of supporting said second packages on respective second carriers which are fixed against rotation.

4. A conveying apparatus for conveying first and second packages side-by-side in first and second adjacent parallel rows, respectively, in a conveying direction along a conveying path, comprising:

a first row of rotatable first carriers (12a) for carrying the first packages in a first angular orientation;

a second row of non-rotatable second carriers (12) for carrying the second packages in said first angular orientation;

means for simultaneously conveying the first and second packages in both rows while simultaneously turning said first carriers (12a) around an axis perpendicular to a plane containing said conveying path and said first and second parallel rows to place the first packages in a second angular orientation rotated by 180° relative to said first angular orientation, and for maintaining said second packages in said first angular orientation; and a plurality of conveyor bars (13) extending transversely relative to said conveying direction, each conveyor bar (13) supporting a corresponding pair of adjacent rotatable first (12a) and non-rotatable second (12) carriers.

5. The apparatus as defined in claim 4, further comprising:

a moving member (15) having a movement and extending in said conveying direction adjacent said first row of said rotatable first carriers (12a); and fixed to each of said rotatable first carriers (12a), roller means (18) for engaging said moving member and converting the movement thereof to a turning of each first carrier (12a) to turn the first packages from said first angular orientation to said second angular orientation.

6. The conveying apparatus as defined in claim 5, wherein said roller means (18) and said moving member (15) are in frictional engagement with each other.

7. The conveying apparatus as defined in claim 5, wherein said roller means (18) and said moving member

(15) are in positive interlocking engagement with each other.

8. The apparatus as defined in claim 5, further comprising means for driving said moving member (15) in said conveying direction.

9. The apparatus as defined in claim 5, wherein said moving member (15) is an endlessly circulating belt.

10. The apparatus as defined in claim 5, wherein said each rotatable first carrier (12a) is fixed to a corresponding transfer shaft (21) to which said roller means (18) is fixed.

11. The apparatus as defined in claim 5, wherein each of said first and second carriers (12a, 12) has a receptacle for holding a package.

12. The conveying apparatus as defined in claim 11, further comprising a first rail (17) guiding said moving member (15) in its direction of movement.

13. The apparatus as defined in claim 12, further comprising guide means (19) for guiding said first carrier (12a) in said conveying direction and for preventing rotation of said first carriers in a region outside of which said moving member (15) extends.

14. The apparatus as defined in claim 13, wherein said guide means comprises two second rails (19) disposed upstream and downstream, respectively, of said moving member (15).

15. The apparatus as defined in claim 14, wherein said each first carrier (12a) has a guide piece (20) extending beyond said roller means (18), and wherein each of said second rails is a U-shaped rail having a U-shaped opening in which said guide piece travels.

16. The apparatus as defined in claim 14, wherein said each first carrier (12a) has a guide piece (20) which extends beyond said roller means (18) and which has a plurality of offset guide channels (23, 24) for receiving said second rails (19).

17. The apparatus as defined in claim 5, further comprising guide means (19), disposed at opposite ends of said moving member (15), for guiding said rotatable first carriers (12a) in the conveying direction and for preventing rotation of said first carriers outside a region in which said moving member extends.

18. A conveying apparatus for conveying first and second packages side-by-side in first and second adjacent parallel rows, respectively, in a conveying direction along a conveying path, comprising:
   a first row of rotatable first carriers (12a) for carrying the first packages in a first angular orientation;
   a second row of non-rotatable second carriers (12) for carrying the second packages in said first angular orientation;
   means for simultaneously conveying the first and second packages in both rows while simultaneously turning said first carriers (12a) around an axis perpendicular to a plane containing said conveying path and said first and second parallel rows to place the first packages in a second angular orientation rotated by 180° relative to said first angular orientation, and for maintaining said second packages in said first angular orientation;
   a moving member (15) having a movement and extending in said conveying direction adjacent said first row of said rotatable first carriers (12a); and
   fixed to each of said rotatable first carriers (12a), roller means (18) for engaging said moving member and converting the movement thereof to a turning of each first carrier (12a) to turn the first packages from said first angular orientation to said second angular orientation.

* * * * *